(12) United States Patent
Zhang et al.

(10) Patent No.: US 10,374,714 B2
(45) Date of Patent: Aug. 6, 2019

(54) METHOD FOR ONLINE SWITCHING OF OPERATION MODE OF ONT, ONT AND OLT

(71) Applicant: ZTE CORPORATION, Shenzhen, Guangdong (CN)

(72) Inventors: Yangchun Zhang, Guangdong (CN); Feng He, Guangdong (CN); Sikun Xue, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/741,174

(22) PCT Filed: May 12, 2016

(86) PCT No.: PCT/CN2016/081886
§ 371 (c)(1),
(2) Date: Dec. 29, 2017

(87) PCT Pub. No.: WO2017/000679
PCT Pub. Date: Jan. 5, 2017

(65) Prior Publication Data
US 2018/0198528 A1    Jul. 12, 2018

(30) Foreign Application Priority Data
Jun. 30, 2015   (CN) .......................... 2015 1 0373106

(51) Int. Cl.
*H04B 10/27*    (2013.01)
*H04Q 11/00*    (2006.01)
*H04B 10/2581*   (2013.01)

(52) U.S. Cl.
CPC ......... *H04B 10/2581* (2013.01); *H04B 10/27* (2013.01); *H04Q 11/00* (2013.01); *H04Q 11/0067* (2013.01)

(58) Field of Classification Search
CPC ..... H04B 10/2581; H04B 10/27; H04B 11/00
(Continued)

(56) References Cited
U.S. PATENT DOCUMENTS

| 2010/0196006 A1* | 8/2010 | Lin | ........................ H04L 12/287 398/58 |
| 2011/0131624 A1* | 6/2011 | Wu | ...................... H04L 41/0226 725/111 |

(Continued)

OTHER PUBLICATIONS

ITU-T G.988 Oct. 2010 (Year: 2010).*
Written opinion and ISR of PCT/CN2016/081886 (Year: 2017).*

*Primary Examiner* — Oommen Jacob
(74) *Attorney, Agent, or Firm* — Li & Cai Intellectual Property (USA) Office

(57) ABSTRACT

A method for online switching of an operation mode of an ONT comprises: receiving an OMCI message in an online state by the ONT, wherein the OMCI message carries an indication message for switching the operation mode; and switching the operation mode according to the indication message by the ONT. The above-mentioned method realizes changing of an operation mode of an ONT in real-time in an online state based on the GPON standard, so that the ONT can flexibly operate in a gateway mode or a network bridge mode, and an operator management system only needs to change the operation mode of the ONT through a standard OMCI message according to a local network requirement.

20 Claims, 6 Drawing Sheets

(58) Field of Classification Search
USPC .................................................. 398/25, 9, 1
See application file for complete search history.

(56) References Cited

U.S. PATENT DOCUMENTS

| | | | |
|---|---|---|---|
| 2013/0034356 A1* | 2/2013 | Luo ...................... | H04B 10/272 |
| | | | 398/72 |
| 2015/0215033 A1* | 7/2015 | Lin ........................ | H04B 10/27 |
| | | | 398/2 |
| 2015/0244535 A1* | 8/2015 | Chen ...................... | H04L 12/10 |
| | | | 713/300 |
| 2016/0112185 A1* | 4/2016 | Yin ........................ | H04J 3/0655 |
| | | | 398/58 |
| 2016/0173479 A1* | 6/2016 | Zhang .................... | H04B 10/25 |
| | | | 726/7 |
| 2017/0054719 A1* | 2/2017 | Zheng .................... | H04B 10/25 |
| 2018/0198528 A1* | 7/2018 | Zhang ................... | H04B 10/2581 |

\* cited by examiner

METHOD FOR ONLINE SWITCHING OF OPERATION MODE OF ONT, ONT AND OLT

TECHNICAL FIELD

The present application relates to the field of data communication, and in particular, to a method for online switching of an operation mode of an optical network terminal (ONT), an ONT and an optical line terminal (OLT).

BACKGROUND

At present, in commercial applications of Gigabit-Capable Passive Optical Network (GPON) ONT, due to the need of different markets and regions, typically there are many differences in requirements for an operation mode of an ONT. In some applications, the ONT is required to operate in a network bridge mode to forward data from a user network interface (UNI) side to an access node interface (ANI) side in a bridging manner. In some applications, the ONT is required to operate in a gateway mode to forward data from the UNI side to the ANI side in a routing manner.

Due to the difference in management of the two modes, most devices in telecom markets today are separated to two types of GPON ONT network bridge type and GPON ONT gateway type, which cannot allow operators to flexibly change management modes according to market demands, thereby increasing the cost. Some device providers switch the devices between the gateway mode and the network bridge mode in private ways, however, such an approach cannot make the devices be compatible and capable of intercommunicating with other providers' devices, which is also adverse to the operators' network layout.

SUMMARY

The following is a summary of subject matters described in detail herein. The summary is not intended to limit the protection scope of the claims.

Example embodiments of the present disclosure provide a method for online switching of an operation mode of an ONT, an ONT and an OLT, which can switch the operation mode of the ONT between a network bridge mode and a gateway mode.

Example embodiments of the present disclosure provide a method for online switching of an operation mode of an optical network terminal, including: receiving, by the optical network terminal in an online state, an optical network unit (ONU) management and control interface (OMCI) message, the OMCI message carrying an indication message for switching the operation mode; and switching, by the optical network terminal, the operation mode according to the indication message.

In some implementations, the method further includes: before switching the operation mode according to the indication message by the optical network terminal, testing, by the optical network terminal, whether or not a current Ethernet user network interface (UNI) port can accept a non-OMCI protocol management, and whether or not a virtual Ethernet interface instance to which the current Ethernet UNI port is pointing exists, and switching the operation mode in a case where the current Ethernet user network interface (UNI) port can accept the non-OMCI protocol management, and the virtual Ethernet interface instance to which the current Ethernet UNI port is pointing exists (i.e., the test is passed).

In some implementations, the indication message for switching the operation mode includes an attribute value of a non-OMCI management identifier for a UNI-G instance to which a target Ethernet user network interface belongs, and switching the operation mode according to the indication message by the optical network terminal includes identifying, by the optical network terminal, a target operation mode to be used by reading the attribute value of the non-OMCI management identifier from a data of the UNI-G instance carried by the OMCI message, identifying, by the optical network terminal, a current operation mode by reading the attribute value of the non-OMCI management identifier for the UNI-G instance to which the current Ethernet UNI port belongs, and switching the operation mode in a case where the current operation mode is not identical to the target operation mode to be used.

In some implementations, switching the operation mode by the optical network terminal includes: in a case where the current operation mode is the gateway mode and the target operation mode to be used to is the network bridge mode, bringing all instances relating to the Ethernet UNI port into an OMCI protocol management domain to manage them, and establishing a data link for the Ethernet UNI port in the network bridge mode, and, at the same time, enabling a series of functions essential to a network bridge device.

In some implementations, switching the operation mode by the optical network terminal includes: in a case where the current operation mode is the network bridge mode and the target operation mode to be used is the gateway mode, bringing all instances relating to the Ethernet UNI port out of the OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to a gateway device.

Example embodiments of the present disclose further provide an optical network terminal, including: a receiving module configured to receive an OMCI message in an online state, wherein the OMCI message carries an indication message for switching an operation mode; and a switching module configured to switch the operation mode according to the indication message.

In some implementations, the optical network terminal further includes: a testing module configured to test whether or not a current Ethernet user network interface (UNI) port can accept a non-OMCI protocol management and whether or not a virtual Ethernet interface instance to which the current Ethernet UNI port is pointing exists, and to notify the switching module to switch the operation mode in a case where the current Ethernet user network interface (UNI) port can accept the non-OMCI protocol management and the virtual Ethernet interface instance to which the current Ethernet UNI port is pointing exists (i.e., the test is passed).

In some implementations, the indication message for switching the operation mode includes an attribute value of a non-OMCI management identifier for a UNI-G instance to which a target Ethernet user network interface is attached; and the switching module is configured to switch the operation mode according to the indication message by following steps: identifying a target operation mode to be used by reading the attribute value of the non-OMCI management identifier from a data of the UNI-G instance carried by the OMCI message, identifying a current operation mode by reading the attribute value of the non-OMCI management identifier for the UNI-G instance to which the current Ethernet UNI port is attached, and switching the operation mode in a case where the current operation mode is not identical to the target operation mode to be used.

In some implementations, the switching module is configured to switch the operation mode by following steps: in a case where the current operation mode is the gateway mode and the target operation mode to be used is the network bridge mode, bringing all instances relating to the Ethernet UNI port into an OMCI protocol management domain to manage them, and establishing a data link for the Ethernet UNI port in the network bridge mode, and, at the same time, enabling a series of functions essential to a network bridge device.

In some implementations, the switching module is configured to switch the operation mode by following steps: in a case where the current operation mode is the network bridge mode and the target operation mode to be used is the gateway mode, bringing all instances relating to the Ethernet UNI port out of the OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to a gateway device.

Example embodiments of the present disclose further provide a method for online switching of an operation mode of an optical network terminal, including: establishing, by an optical line terminal, a data link for the optical network terminal through an optical network unit management and control interface (OMCI) protocol; and transmitting, by the optical line terminal, an OMCI message to the optical network terminal, wherein the OMCI message carries an indication message for switching the operation mode.

In some implementations, the indication message for switching the operation mode includes: an attribute value of a non-OMCI management identifier for a UNI-G instance to which a target Ethernet user network interface is attached.

Example embodiments of the present disclose further provide an optical line terminal, including: an establishment module configured to establish a data link for an optical network terminal through an optical network unit management and control interface (OMCI) protocol; and a transmission module configured to transmit an OMCI message to the optical network terminal, wherein the OMCI message carries an indication message for switching an operation mode of the optical network terminal.

In some implementations, the indication message for switching the operation mode comprises: an attribute value of a non-OMCI management identifier for a UNI-G instance to which a target Ethernet user network interface is attached.

Example embodiments of the present disclosure further provide a computer readable storage medium storing computer executable instructions, the computer executable instructions, when executed, realizing the above-described method applied at an optical line network side for online switching of an operation mode of an optical network terminal.

Embodiments of the present disclosure further provide a computer readable storage medium storing computer executable instructions, which, when executed, realizing the above-described method applied at an optical network terminal side for online switching of an operation mode of an optical network terminal.

Other aspects may be apparent upon reading and understanding the accompanying drawings and the detailed description.

DETAILED DESCRIPTION

Example embodiments of the present disclose will be described in detail hereinafter in conjunction with the drawings. It should be noted that, example embodiments of the present application and features in the embodiments may be combined into any combination with one another without conflict therebetween.

Figure 1:
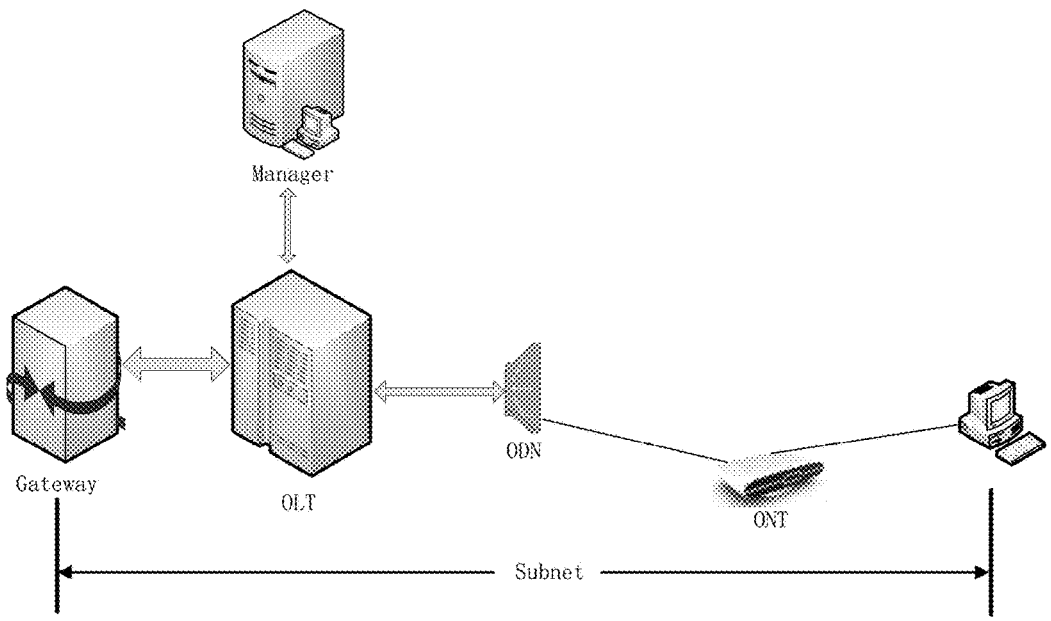
FIG. 1 is a diagram of a network topology structure of an ONT operating in a network bridge mode.

FIG. 1 shows a diagram of a network topology structure of an ONT operating in a network bridge mode. As shown in FIG. 1, in a subnet, the network topology structure comprises a manager, a gateway, an OLT, an optical distribution network or node (ODN), an ONT and a terminal device, for example a computer, wherein, the ONT operates in the network bridge mode to forward data from a user network interface (UNI) side to an access node interface (ANI) side in a bridging manner.

Figure 2:
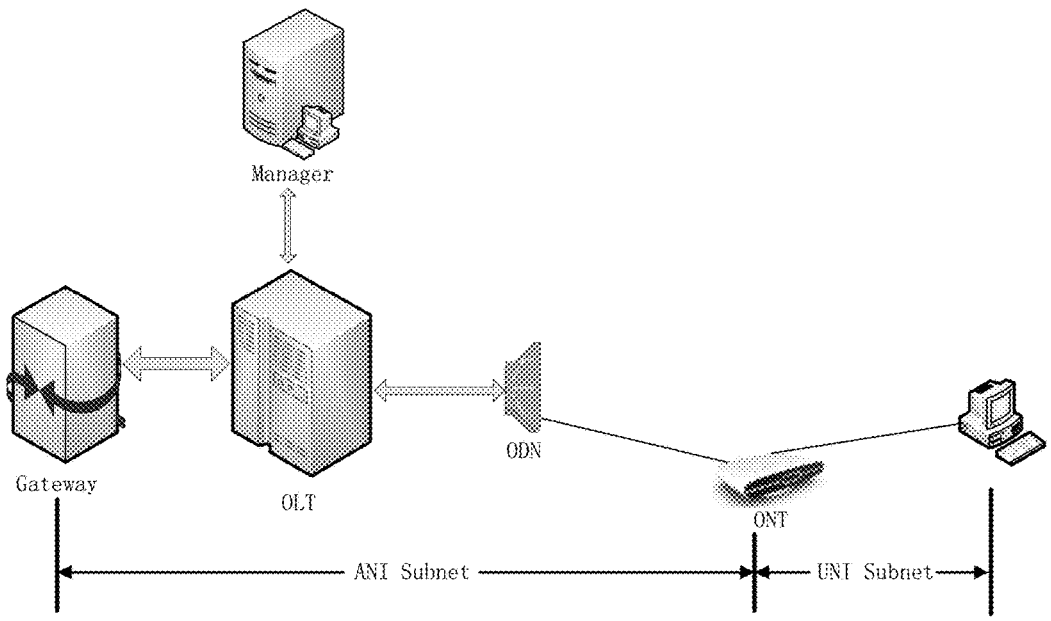
FIG. 2 is a diagram of a network topology structure of an ONT operating in a gateway mode.

FIG. 2 shows a diagram of a network topology structure of an ONT operating in a gateway mode. As shown in FIG. 2, a subnet includes an ANI subnet and a UNI subnet, the network topology structure in the subnet comprises a manager, a gateway, an OLT, an ODN, an ONT and for example a computer, wherein, the ONT operates in the gateway mode to forward data from the UNI side to the ANI side in a routing manner.

Figure 5:
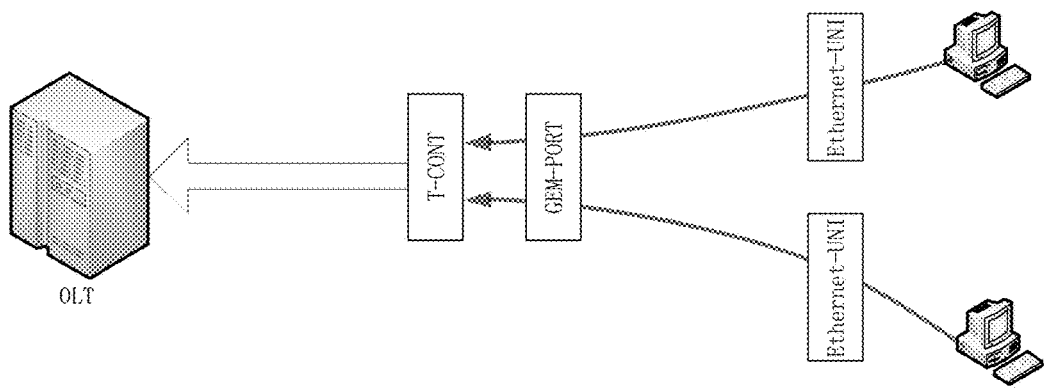
FIG. 5 is a schematic diagram of a data link between a network bridge type ONT and an OLT.
Figure 6:
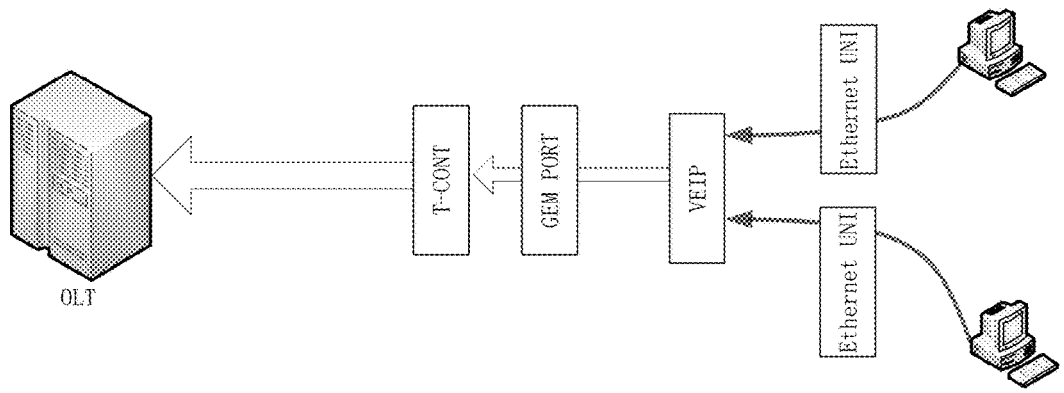
FIG. 6 is a schematic diagram of a data link between a gateway type ONT and an OLT.

In a GPON system, data required to be distributed to the ONT by an OLT in the network bridge mode is different from that in the gateway mode. In the network bridge mode as shown in FIG. 5, it is required for the OLT to configure a complete data link from a UNI port to a GPON encapsulation mode (GEM) port to a transmission container (T-CONT); in the gateway mode as shown in FIG. 6, the OLT only needs to configure a data link from a virtual Ethernet interface point (VEIP) to a GEM port to a T-CONT, while data domain between the UNI port and the VEIP is configured and managed, as a data domain of Gateway, by other media (such as TR0069, web administration page, etc.).

Figure 3:
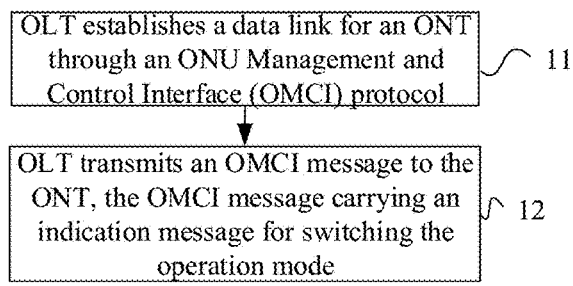
FIG. 3 is a flowchart of a method for online switching an operation mode of an ONT at an OLT side according to an embodiment of the present disclosure.

FIG. 3 is a flowchart of a method for online switching of an operation mode of an ONT at an OLT side according to an example embodiment of the present disclosure. As shown in FIG. 3, the method according to the example embodiment includes step 11 and step 12.

At step 11, an OLT establishes a data link for an ONT through an OMCI protocol.

At step 12, the OLT transmits an OMCI message to the ONT, the OMCI message carrying an indication message for switching the operation mode.

Figure 4:
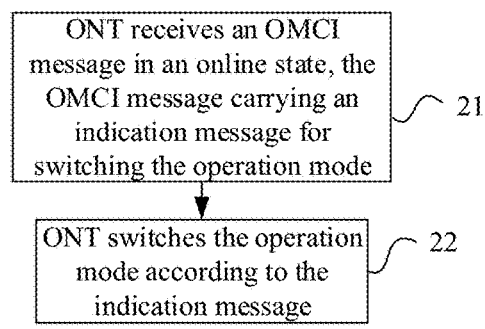
FIG. 4 is a flowchart of a method for online switching an operation mode of an ONT at an ONT side according to an embodiment of the present disclosure.

FIG. 4 is a flowchart of a method for online switching of an operation mode of an ONT at an ONT side according to an embodiment of the present disclosure. As shown in FIG. 4, the method according to the embodiment includes step 21 and step 22.

At step 21, the ONT receives the OMCI message in an online state, the OMCI message carrying the indication message for switching the operation mode.

At step 22, the ONT switches the operation mode according to the indication message.

Figure 7:
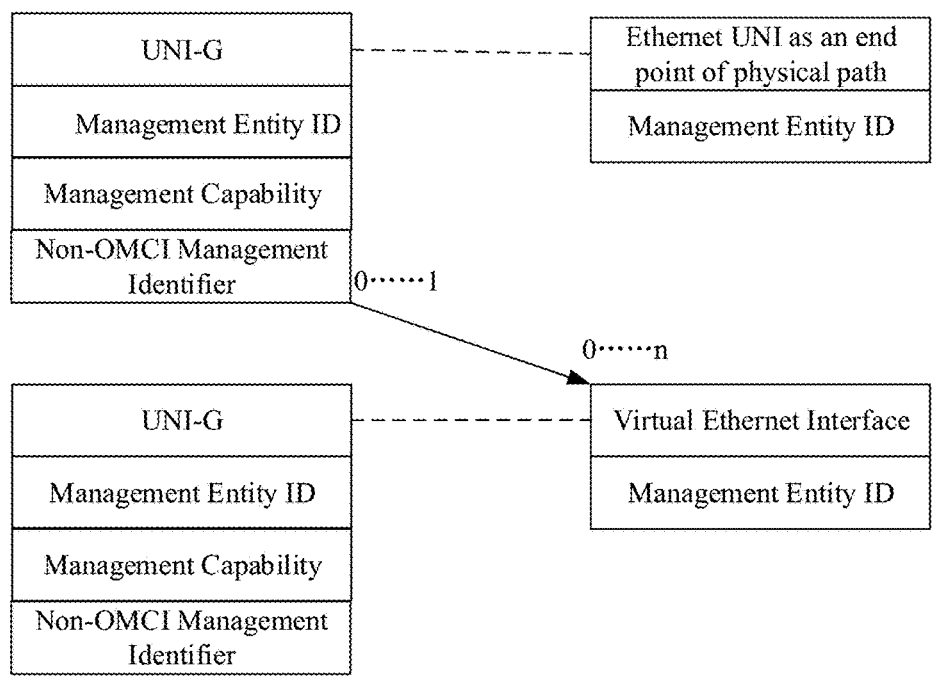
FIG. 7 is a diagram illustrating a relationship of key entities and key attributes in ITU-T G.988.

According to Telecommunication Standardization Sector of International Telecommunication Union (ITU-T) G988, there is a specific relationship among ONT Ethernet UNI port instances, VEIP instances and user-network-interfaces-supported-by-GEM (UNI-G) entities, which is illustrated in FIG. 7.

As shown in FIG. 7, each of the Ethernet UNI port instances, the VEIP instances and the UNI-G entities has a management entity ID, each Ethernet UNI port instance or VEIP instance has one UNI-G entity covert-linked therewith, that is, the UNI-G entity having the same mobile equipment identifier (MEID). There are two key attributes in the UNI-G entity: "management capability" and "Non optical network unit management and control interface (Non-OMCI) management identifier".

The management capability is a capability data, which is initialized by the ONT according to actual conditions of the management protocol acceptable to its own relevant port, to one of three values: 0, 1, and 2.

The value 0 indicates that the management is conducted only through an OMCI protocol.

The value 1 indicates that the management is conducted only through another protocol other than the OMCI protocol.

The value 2 indicates that both of the above two manners are supported.

The Non-OMCI management identifier is a management domain data, which is initialized by the ONT according to a current management protocol of its own relevant port. In a case of currently being managed under the OMCI protocol, the Non-OMCI management identifier is initialized to a value of 0, and in a case of currently being managed under another protocol such as a TR069 protocol, the Non-OMCI management identifier is initialized to an MEID of one VEIP (the MEID corresponding to a specific management protocol domain, such as TR069) instance.

An ONT in the network bridge mode is realized as follows. According to the entity relationship shown in FIG. 7, in a case where a certain Ethernet UNI port of the ONT in the initial state operates in the network bridge mode, the ONT initializes the attribute of "Non-OMCI management identifier" for the UNI-G corresponding thereto to a default value of 0, as shown in FIG. 5, and thereafter, in a management information base (MIB) audit stage of the OLT, the initial state is uploaded to the OLT.

Figure 8:
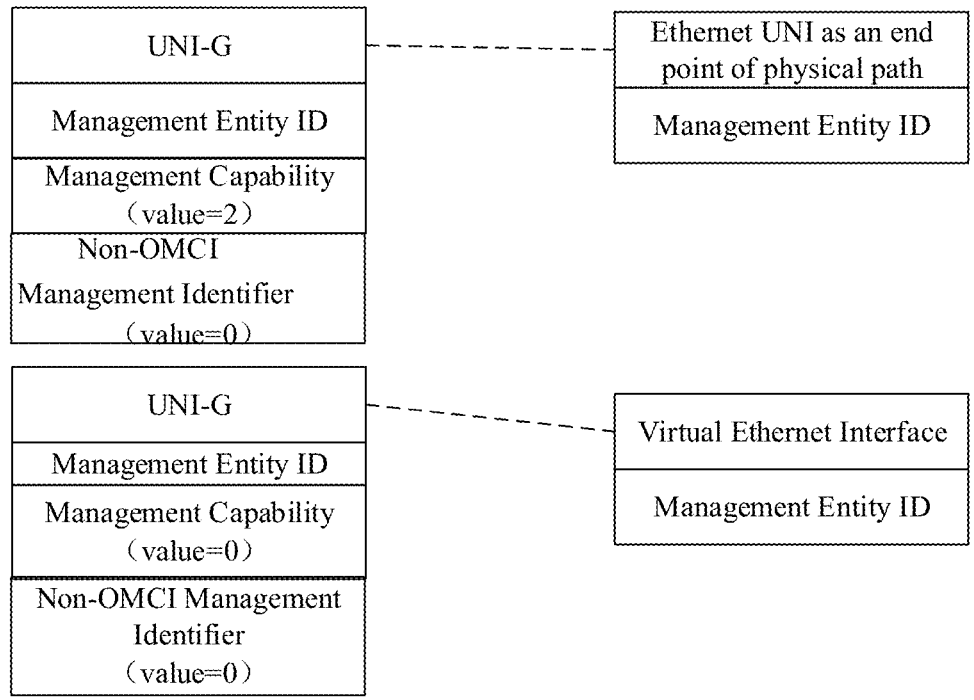
FIG. 8 is a diagram illustrating information of key entities and attributes inside a network bridge type ONT.

By checking the key data shown in FIG. 8, the OLT can determine that the current Ethernet UNI port of the current ONT operates in the network bridge mode.

An ONT in the gateway mode is realized as follows. According to the entity relationship shown in FIG. 7, in a case where a certain Ethernet UNI port of the ONT in the initial state operates in the gateway mode, the ONT initializes the attribute of "Non-OMCI management identifier" for the UNI-G corresponding thereto to a MEID of a certain VEIP entity, as shown in FIG. 6, and thereafter, in the MIB audit stage of the OLT, the initial state is uploaded to the OLT.

Figure 9:
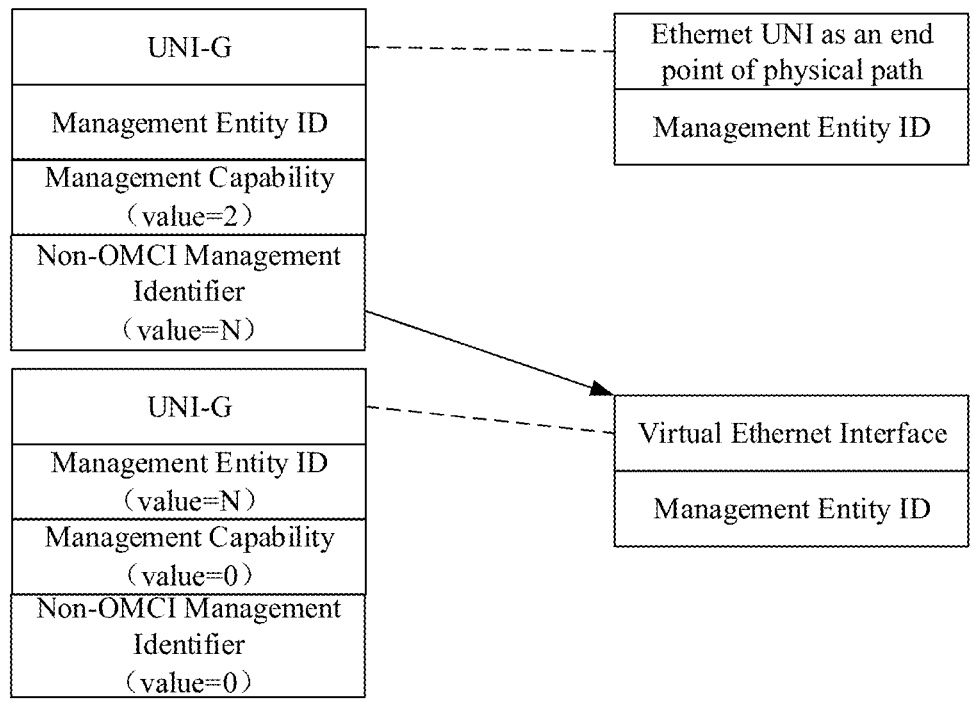
FIG. 9 is a diagram illustrating information of key entities and attributes inside a gateway type ONT.

By checking the key data shown in FIG. 9, the OLT can determine that the current Ethernet UNI port of the current ONT is under a non-OMCI domain management, that is, currently operates in the gateway mode.

Online switching between the network bridge mode and the gateway mode is realized as follows. In a case where the OLT and the ONT complete the MIB audit and enter a stable operation state, i. e. online state, if a user desires to change the initial operation mode of the ONT through the OLT, dynamic switching can be realized by adjusting the attribute of "Non-OMCI management identifier" for the UNI-G instance to which the target Ethernet UNI port belongs via the OMCI message.

After receiving the OMCI message, if it is determined that the message indicates switching to the network bridge mode, the OLT brings all instances relating to the Ethernet UNI ports into the OMCI protocol management domain to manage them, establishes data links for these ports in the network bridge mode, and, at the same time, enables a series of functions essential to the network bridge device; and if it is determined that the message indicates switching to the gateway mode, the OLT brings all instances relating to the Ethernet UNI ports out of the OMCI protocol management domain so that only a checking of state information and statistical information of these ports under the OMCI protocol is supported, and establishes data links between these ports and VEIP in the gateway mode (such data links may also be established by other management protocols), and, at the same time, enables a series of functions essential to the gateway device for the ONT.

Figure 10:
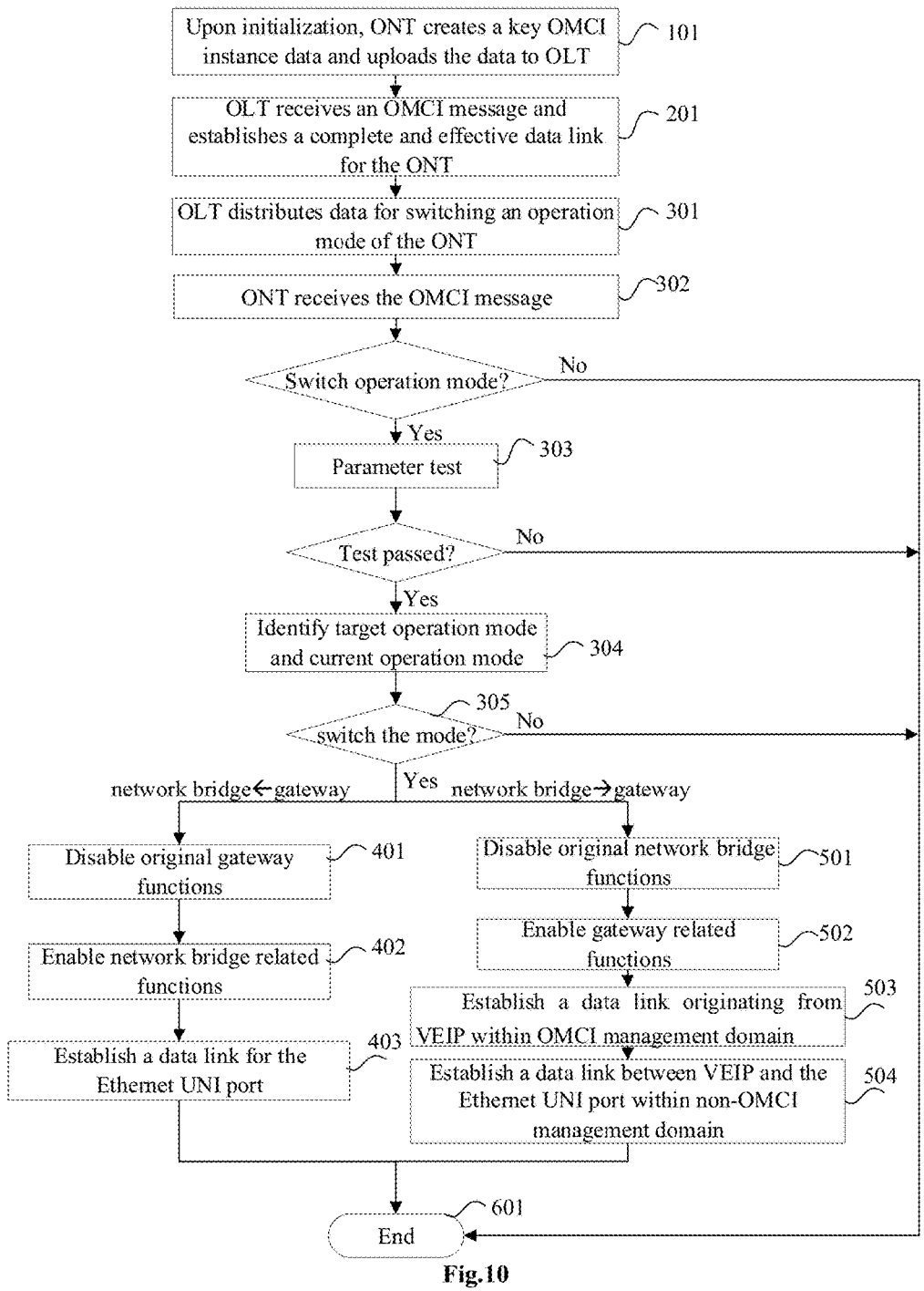
FIG. 10 is a flowchart of an implementation of a method for online switching an operation mode of an ONT according to an embodiment of the present disclosure.

An application example of the example embodiment is described with reference to data link models shown in FIGS. 5 and 6 and the flowchart shown in FIG. 10, the application example including steps 101, 201, 301-305, 401-403, 501-504, and 601.

At step 101, upon initialization, the ONT creates data of a key OMCI instance in the network bridge (or gateway) mode, and uploads the data to the OLT in a manner of MIB audit or synchronization.

At step 201, the OLT receives an OMCI message and establishes a complete and effective data link for the ONT.

As shown in FIG. 5, the OLT establishes the complete and effective data link for the ONT through the OMCI protocol, the data link including virtual local area network (VLAN) information for the Ethernet UNI port, linking of various services with GEM port and T-CONT, and the like.

At step 301, the OLT distributes data for switching an operation mode of the ONT through the OMCI protocol so that the ONT switches the operation mode thereof from the initialized network bridge mode to the gateway mode, or from the initialized network gateway mode to the network bridge mode.

At step 302, after receiving the related OMCI message, the ONT first determines whether the OMCI message carries an indication message for switching the operation mode. In a case where the OMCI message is determined to be carrying the indication message, it proceeds to step 303. In a case where the OMCI message is determined to be not carrying the indication message, it proceeds to step 601. The indication message for switching the operation mode includes: an attribute value of the non-OMCI management identifier for the UNI-G instance to which a target Ethernet user network interface is attached.

At step 303, the ONT performs a necessary effectiveness test on key data and attribute values, the effectiveness test including testing whether or not the ONT's current Ethernet UNI port can accept the non-OMCI protocol management, whether or not a VEIP instance to which the current Ethernet UNI port is pointing exists, etc. In a case where the ONT's current Ethernet UNI port can accept the non-OMCI protocol management and the VEIP instance to which the current Ethernet UNI port is pointing exists (i.e., the test is passed), it proceeds to step 304; in a case where the ONT's current Ethernet UNI port cannot accept the non-OMCI protocol management or the VEIP instance to which the current Ethernet UNI port is pointing does not exist (i.e., the test is not passed), it proceeds to step 601.

At step 304, the ONT identifies the current operation mode and the target operation mode to be used, respectively, according to current system operation parameters and OMCI protocol data distributed by the OLT.

The ONT identifies the target operation mode to be used by reading the attribute value of the non-OMCI management identifier in the UNI-G instance data carried by the OMCI message, and identifies the current operation mode by reading the attribute value of the non-OMCI management identifier for the UNI-G instance to which the current Ethernet UNI port is attached.

At step 305, in a case where the target operation mode is identical to the current operation mode, that is, the target operation mode to be used happens to be the current operation mode of the ONT, then it proceeds to step 601; in a case where the target operation mode is not identical to the current operation mode, if it is further determined that the switching is from the gateway mode to the network bridge mode, it proceeds to step 401, and if the switching is from the network bridge mode to the gateway mode, it proceeds to step 501.

At step 401, functions relating to the current gateway mode, such as a management configuration function of the TR069 protocol, a routing function of the current Ethernet UNI port and the like, are disabled.

At step 402, functions relating to the network bridge mode, such as an OMCI protocol management configuration function, a bridging function of the current Ethernet UNI port and the like, are enabled.

At step 403, OMCI protocol configuration data relating to the network bridge mode is received from the OLT, a response is produced, and a complete data link is established for the current Ethernet UNI port.

At step 501, the functions relating to the current network bridge mode such as the OMCI protocol management configuration function, the bridging function of the current Ethernet UNI port and the like are disabled.

At step 502, the functions relating to the gateway mode such as the management configuration function of the TR069 protocol, the routing function of the current Ethernet UNI port and the like are enabled.

At step 503, OMCI protocol configuration data relating to the gateway mode is received from the OLT and a response is produced, and a data link from VEIP to GEM port and T-CONT is established.

At step 504, a gateway section data link between the Ethernet UNI port and VEIP under other protocol management domain (such as TR069, SNMP, Web, etc.) is established.

At step 601, the process ends.

Figure 11:
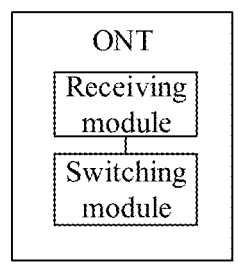
FIG. 11 is a schematic diagram of an ONT according to an embodiment of the present disclosure.

FIG. 11 is a schematic diagram of an ONT according to an example embodiment of the present disclosure. As shown in FIG. 11, the ONT according to the example embodiment includes a receiving module and a switching module.

The receiving module is configured to receive an OMCI message in an online state, wherein the OMCI message carries an indication message for switching an operation mode.

The switching module is configured to switch the operation mode according to the indication message.

In an example embodiment, the ONT further includes a testing module.

The testing module is configured to test whether or not the current Ethernet UNI port can accept the non-OMCI protocol management and whether or not a virtual Ethernet interface instance to which the current Ethernet UNI port is pointing exists, and notify the switching module to switch the operation mode in a case where the current Ethernet UNI port can accept the non-OMCI protocol management and the virtual Ethernet interface instance to which the current Ethernet UNI port is pointing exists (i.e., the test is passed).

In an example embodiment, the indication message for switching the operation mode includes: an attribute value of the non-OMCI management identifier for the UNI-G instance to which a target Ethernet user network interface is attached.

The switching module is configured to switch the operation mode according to the indication message by following steps: identifying a target operation mode to be used by reading the attribute value of the non-OMCI management identifier from a UNI-G instance data carried by the OMCI message, identifying a current operation mode by reading the attribute value of the non-OMCI management identifier for the UNI-G instance to which the current Ethernet UNI port is attached, and switching the operation mode in a case where the current operation mode is not identical to the target operation mode to be used.

In an example embodiment, the switching module is configured to switch the operation mode by following steps: in a case where the current operation mode is the gateway mode and the target operation mode to be used is the network bridge mode, bringing all instances relating to the Ethernet UNI port into the OMCI protocol management domain to manage them, establishing a data link for the Ethernet UNI port in the network bridge mode, and, at the same time, enabling a series of functions essential to a network bridge device.

In an example embodiment, the switching module is configured to switch the operation mode by following steps: in a case where the current operation mode is the network bridge mode and the target operation mode to be used is the gateway mode, bringing all instances relating to the Ethernet UNI port out of the OMCI protocol management domain so that only a checking of state information and statistical information of the Ethernet UNI port under the OMCI protocol is supported, and establishing a data link between the Ethernet UNI port and VEIP in the gateway mode, and, at the same time, enabling a series of functions essential to a gateway device.

Figure 12:
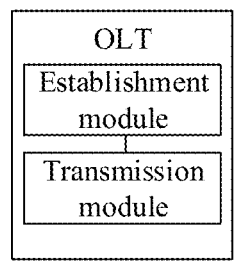
FIG. 12 is a schematic diagram of an OLT according to an embodiment of the present disclosure.

FIG. 12 is a schematic diagram of an OLT according to an example embodiment of the present disclosure. As shown in FIG. 12, the OLT according to the example embodiment includes an establishment module and a transmission module.

The establishment module is configured to establish a data link for an optical network terminal through an OMCI protocol.

The transmission module is configured to transmit an OMCI message to the optical network terminal, wherein the OMCI message carries an indication message for switching an operation mode.

In this example embodiment, data relating to switching of the operation mode carried by the OMCI message includes: an attribute value of a non-OMCI management identifier for the UNI-G instance to which a target Ethernet user network interface is attached.

Example embodiments of the present disclosure further provide a computer readable storage medium storing computer executable instructions, which, when executed, realize the above-described method applied at an OLT side for online switching of an operation mode of an ONT.

Example embodiments of the present disclosure further provide a computer readable storage medium storing computer executable instructions, the computer executable instructions, when executed, realizing the above-described method applied at ONT side for online switching of an operation mode of an ONT.

A person of ordinary skill in the art may understand that, all or some of the steps in the above method may be implemented by a program instructing a related hardware such as a processor, and the program may be stored in a computer readable storage medium such as a read-only memory, a magnetic disk, an optical disk, or the like. Optionally, all or some of the steps of the above embodiments may also be implemented by using at least one integrated circuit. Accordingly, modules/units of the above embodiments may be implemented in the form of hardware, for example, respective functions thereof may be implemented by integrated circuits, or may also be implemented in the form of software function modules, for example, respective functions thereof may be implemented by a processor executing a program/instructions stored in a memory. The present application is not limited to any specific form of combination of hardware and software.

The above embodiments are merely exemplary embodiments of the present application and various other embodiments are also possible. Those skilled in the art may make various changes and modifications based on the present application without departing from the essence of the present application. However, any of these changes and modifications should fall into the protection scope defined by the appended claims of the present application.

INDUSTRIAL APPLICABILITY

Example embodiments of the present application provide a method for online switching of an operation mode of an ONT, an ONT and an OLT, which can change an operation mode of the ONT in real-time in an online state based on the GPON standard, so that the ONT can flexibly operate in the gateway mode or the network bridge mode, and an operator management system only needs to change the operation mode of the ONT through a standard OMCI message according to a local network requirement.

What is claimed is:

1. A method for online switching of an operation mode of an optical network terminal, comprising:
receiving, by the optical network terminal, an optical network unit (ONU) management and control interface (OMCI) message in an online state, the OMCI message carrying an indication message for switching the operation mode; and
switching, by the optical network terminal, the operation mode to a network bridge mode or a gateway mode according to the indication message,
wherein the indication message for switching the operation mode comprises an attribute value of a non-OMCI management identifier for a UNI-G instance to which a target Ethernet user network interface belongs.

2. The method according to claim 1, further comprising:
before switching the operation mode according to the indication message, testing, by the optical network terminal, whether or not a current Ethernet user network interface (UNI) port can accept a non-OMCI protocol management, and whether or not a virtual Ethernet interface instance to which the current Ethernet UNI port is pointing exists, and in a case where the current Ethernet user network interface (UNI) port can accept the non-OMCI protocol management, and the virtual Ethernet interface instance to which the current Ethernet UNI port is pointing exists, switching the operation mode.

3. The method according to claim 1, wherein
switching the operation mode according to the indication message comprises identifying, by the optical network terminal, a target operation mode to be used by reading the attribute value of the non-OMCI management identifier from a data of the UNI-G instance carried by the OMCI message, identifying, by the optical network terminal, a current operation mode by reading the attribute value of the non-OMCI management identifier for the UNI-G instance to which a current Ethernet UNI port belongs, and switching the operation mode in a case where the current operation mode is not identical to the target operation mode to be used.

4. The method according to claim 2, wherein
switching the operation mode according to the indication message comprises identifying, by the optical network terminal, a target operation mode to be used by reading the attribute value of the non-OMCI management identifier from a data of the UNI-G instance carried by the OMCI message, identifying, by the optical network terminal, a current operation mode by reading the attribute value of the non-OMCI management identifier for the UNI-G instance to which a current Ethernet UNI port belongs, and switching the operation mode in a case where the current operation mode is not identical to the target operation mode to be used.

5. The method according to claim 3, wherein switching the operation mode by the optical network terminal comprises:
in a case where the current operation mode is the gateway mode and the target operation mode to be used is the network bridge mode, bringing all instances relating to the current Ethernet UNI port into an OMCI protocol management domain to manage them, and establishing a data link for the Ethernet UNI port in the network bridge mode, and, at the same time, enabling a series of functions essential to the network bridge device.

6. The method according to claim 4, wherein switching the operation mode by the optical network terminal comprises:

in a case where the current operation mode is the gateway mode and the target operation mode to be used is the network bridge mode, bringing all instances relating to the current Ethernet UNI port into an OMCI protocol management domain to manage them, and establishing a data link for the Ethernet UNI port in the network bridge mode, and, at the same time, enabling a series of functions essential to the network bridge device.

7. The method according to claim 3, wherein switching the operation mode by the optical network terminal comprises:

in a case where the current operation mode is the network bridge mode and the target operation mode to be used is the gateway mode, bringing all instances relating to the current Ethernet UNI port out of an OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to the gateway device.

8. The method according to claim 4, wherein switching the operation mode by the optical network terminal comprises:

in a case where the current operation mode is the network bridge mode and the target operation mode to be used is the gateway mode, bringing all instances relating to the current Ethernet UNI port out of an OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to the gateway device.

9. A non-transitory computer readable storage medium storing computer executable instructions, the computer executable instructions, when executed, realizing the method of claim 1 applied at an optical network terminal side for online switching of an operation mode of an optical network terminal.

10. An optical network terminal, comprising:

a receiving module configured to receive an optical network unit (ONU) management and control interface (OMCI) message in an online state, wherein the OMCI message carries an indication message for switching an operation mode; and a switching module configured to switch the operation mode to a network bridge mode or a gateway mode according to the indication message, wherein the indication message for switching the operation mode comprises an attribute value of a non-OMCI management identifier for a UNI-G instance to which a target Ethernet user network interface belongs.

11. The optical network terminal according to claim 10, further comprising:

a testing module configured to test whether or not a current Ethernet user network interface (UNI) port can accept a non-OMCI protocol management and whether or not a virtual Ethernet interface instance to which the current Ethernet UNI port is pointing exists, and to notify the switching module to switch the operation mode in a case where the current Ethernet user network interface (UNI) port can accept the non-OMCI protocol management and the virtual Ethernet interface instance to which the current Ethernet UNI port is pointing exists.

12. The optical network terminal according to claim 10, wherein the switching module is configured to switch the operation mode according to the indication message by identifying a target operation mode to be used by reading the attribute value of the non-OMCI management identifier from a data of the UNI-G instance carried by the OMCI message, identifying a current operation mode by reading the attribute value of the non-OMCI management identifier for the UNI-G instance to which a current Ethernet UNI port belongs, and switching the operation mode in a case where the current operation mode is not identical to the target operation mode to be used.

13. The optical network terminal according to claim 11, wherein the switching module is configured to switch the operation mode according to the indication message by identifying a target operation mode to be used by reading the attribute value of the non-OMCI management identifier from a data of the UNI-G instance carried by the OMCI message, identifying a current operation mode by reading the attribute value of the non-OMCI management identifier for the UNI-G instance to which a current Ethernet UNI port belongs, and switching the operation mode in a case where the current operation mode is not identical to the target operation mode to be used.

14. The optical network terminal according to claim 12, wherein the switching module is configured to switch the operation mode by: in a case where the current operation mode is the gateway mode and the target operation mode to be used is the network bridge mode, bringing all instances relating to the current Ethernet UNI port into an OMCI protocol management domain to manage them, and establishing a data link for the Ethernet UNI port in the network bridge mode, and, at the same time, enabling a series of functions essential to the network bridge device.

15. The optical network terminal according to claim 13, wherein the switching module is configured to switch the operation mode by: in a case where the current operation mode is the gateway mode and the target operation mode to be used is the network bridge mode, bringing all instances relating to the current Ethernet UNI port into an OMCI protocol management domain to manage them, and establishing a data link for the Ethernet UNI port in the network bridge mode, and, at the same time, enabling a series of functions essential to the network bridge device.

16. The optical network terminal according to claim 12, wherein the switching module is configured to switch the operation mode by: in a case where the current operation mode is the network bridge mode and the target operation mode to be used is the gateway mode, bringing all instances relating to an Ethernet UNI port out of an OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to the gateway device.

17. The optical network terminal according to claim 13, wherein the switching module is configured to switch the operation mode by: in a case where the current operation mode is the network bridge mode and the target operation mode to be used is the gateway mode, bringing all instances relating to an Ethernet UNI port out of an OMCI protocol management domain so that only a checking of state information and statistical information of the Ethernet UNI port under an OMCI protocol is supported, and establishing a data link between the Ethernet UNI port and a virtual Ethernet interface in the gateway mode, and, at the same time, enabling a series of functions essential to the gateway device.

18. A method for online switching of an operation mode of an optical network terminal, comprising:

establishing, by an optical line terminal, a data link for the optical network terminal through an optical network unit management and control interface (OMCI) protocol; and transmitting, by the optical line terminal, an OMCI message to the optical network terminal, wherein the OMCI message carries an indication message for switching the operation mode of the optical network terminal to a network bridge mode or a gateway mode, and the indication message for switching the operation mode comprises: an attribute value of a non-OMCI management identifier for a UNI-G instance to which a target Ethernet user network interface belongs.

19. A non-transitory computer readable storage medium storing computer executable instructions, the computer executable instructions, when executed, realizing the method of claim 18 applied at an optical line terminal side for online switching of an operation mode of an optical network terminal.

20. An optical line terminal, comprising:

an establishment module configured to establish a data link for an optical network terminal through an optical network unit management and control interface (OMCI) protocol; and a transmission module configured to transmit an OMCI message to the optical network terminal to indicate the optical network terminal to switch an operation mode to a network bridge mode or a gateway mode, wherein the OMCI message carries an indication message for switching an operation mode of the optical network terminal, and the indication message for switching the operation mode comprises: an attribute value of a non-OMCI management identifier for a UNI-G instance to which a target Ethernet user network interface belongs.

* * * * *